(12) United States Patent
Lindsey et al.

US006991250B2

(10) Patent No.: US 6,991,250 B2
(45) Date of Patent: Jan. 31, 2006

(54) MULTIPLE USE CONVERTIBLE VEHICLE

(76) Inventors: Alan L. Lindsey, 18871 SE. Tickle Creek Ct., Boring, OR (US) 97009; David E. Lindsey, P.O. Box 385, North Plains, OR (US) 97133

( * ) Notice: Subject to any disclaimer, the term of this patent is extended or adjusted under 35 U.S.C. 154(b) by 259 days.

(21) Appl. No.: 10/684,530

(22) Filed: Oct. 15, 2003

(65) Prior Publication Data

US 2004/0080128 A1 Apr. 29, 2004

Related U.S. Application Data

(60) Provisional application No. 60/418,723, filed on Oct. 17, 2002.

(51) Int. Cl.
*B62B 1/12* (2006.01)
(52) U.S. Cl. .................... 280/651; 280/656; 280/63; 280/30
(58) Field of Classification Search ............ 280/30, 280/38, 645, 651, 652, 656, 655, 655.1, 47.17, 280/47.18, 47.2, 47.24, 47.33, 47.331, 63, 280/79.3
See application file for complete search history.

(56) References Cited

U.S. PATENT DOCUMENTS

| | | | | |
|---|---|---|---|---|
| 2,387,093 A | | 10/1945 | Schmied | |
| 3,887,208 A | * | 6/1975 | Vidal | 280/648 |
| 4,175,768 A | * | 11/1979 | Thackray | 280/652 |
| 4,372,568 A | * | 2/1983 | Campbell | 280/63 |
| 4,480,851 A | * | 11/1984 | St-Pierre | 280/656 |
| 4,671,530 A | * | 6/1987 | van der Wouden | 280/656 |
| 5,064,020 A | * | 11/1991 | Eagleson | 182/20 |
| 5,224,728 A | * | 7/1993 | Ball | 280/476.1 |
| 5,228,716 A | | 7/1993 | Dahl | |
| 5,257,892 A | | 11/1993 | Branch | |
| 5,282,520 A | | 2/1994 | Walker | |
| 5,489,109 A | | 2/1996 | Murphy | |

(Continued)

FOREIGN PATENT DOCUMENTS

CA 1110680 10/1981

(Continued)

*Primary Examiner*—Frank Vanaman
(74) *Attorney, Agent, or Firm*—Richard C. Litman

(57) ABSTRACT

A multiple use convertible vehicle modified manually into various configurations, including a hand-towed cart, a hand truck, a hitchable trailer, a bicycle rack, a bed and a chair. The handle is attached to the main frame structure in an extended fashion and at an angle from a hitch bracket to use the vehicle as a hand-towed cart. Or, the handle is attached in a retracted fashion beneath the main frame to allow use of the vehicle as a hitchable trailer or a hand truck. Or, the handle is attached to the main frame at an angle from the hitch bracket to obtain a chair configuration. Or, the handle can be attached to the main frame in an extended fashion to form a bed configuration. Finally, the handle can be detached from the main frame structure, which can be mounted on a bike rack accessory, for use as a bicycle rack.

12 Claims, 22 Drawing Sheets

U.S. PATENT DOCUMENTS

| | | | |
|---|---|---|---|
| 5,664,799 A * | 9/1997 | Cavanaugh | 280/656 |
| 5,915,706 A * | 6/1999 | Mosley | 280/47.26 |
| 6,102,370 A | 8/2000 | Johnston | |
| 6,109,644 A * | 8/2000 | Cox | 280/652 |
| 6,585,285 B2 * | 7/2003 | Koch | 280/656 |
| 6,733,026 B1 * | 5/2004 | Robberson et al. | 280/415.1 |
| 6,811,180 B1 * | 11/2004 | Molliere | 280/652 |

FOREIGN PATENT DOCUMENTS

| | | | | |
|---|---|---|---|---|
| GB | 2210337 | * | 7/1989 | 280/656 |
| GB | 2258435 | * | 2/1993 | 280/652 |
| SU | 1781124 | * | 12/1992 | 280/652 |
| WO | WO 93/02879 | | 2/1993 | |

* cited by examiner

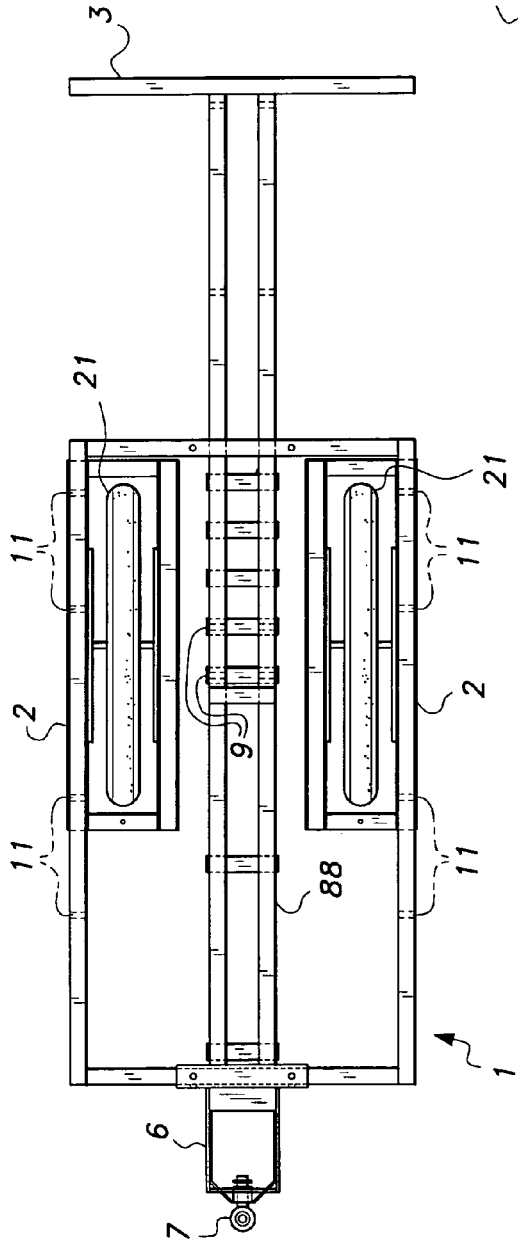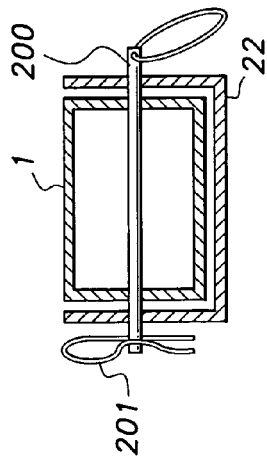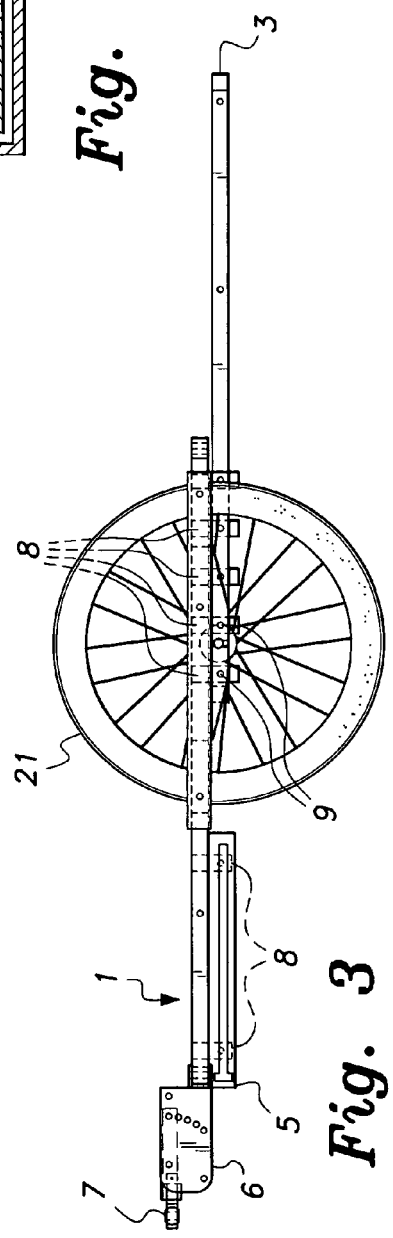

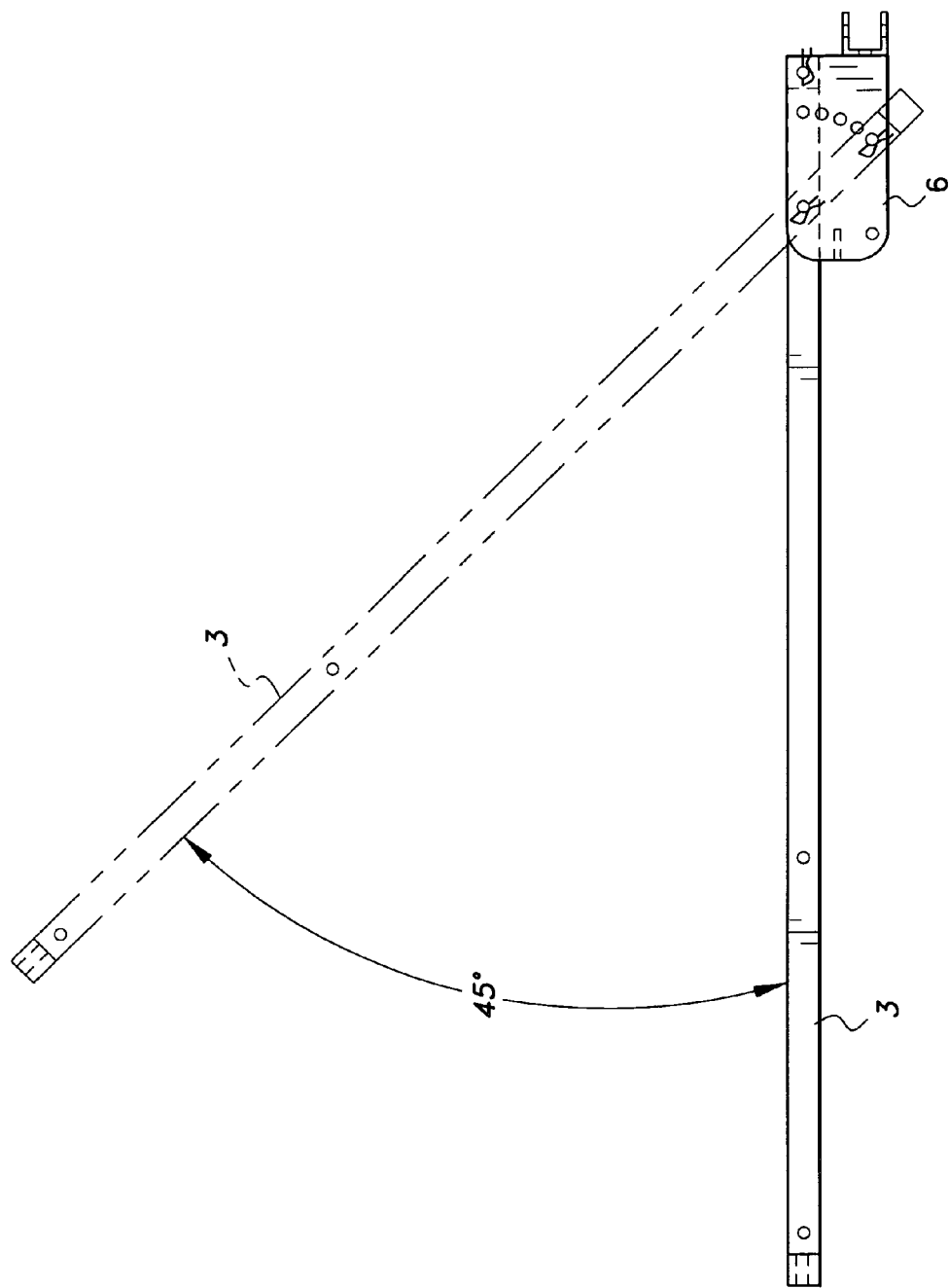

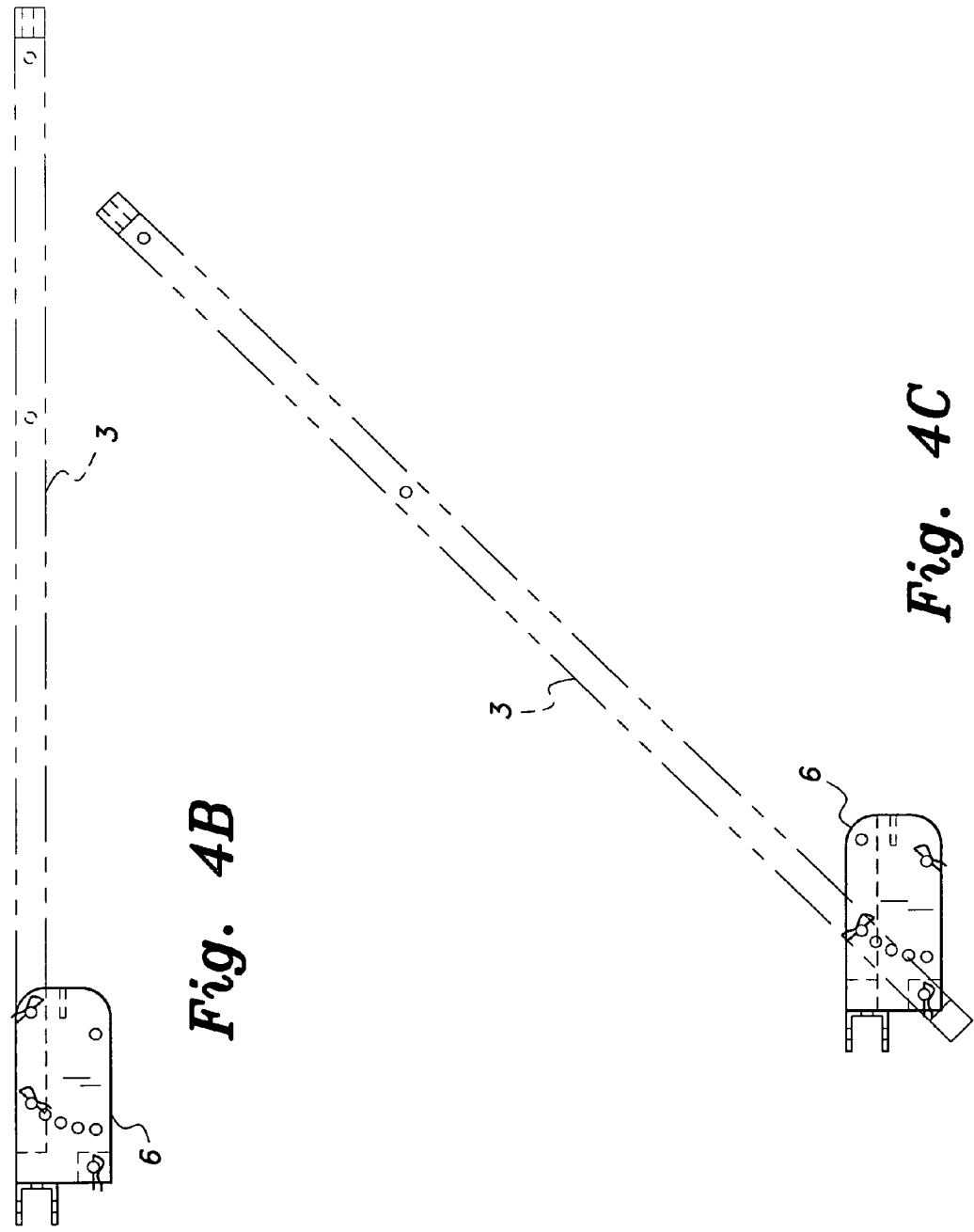

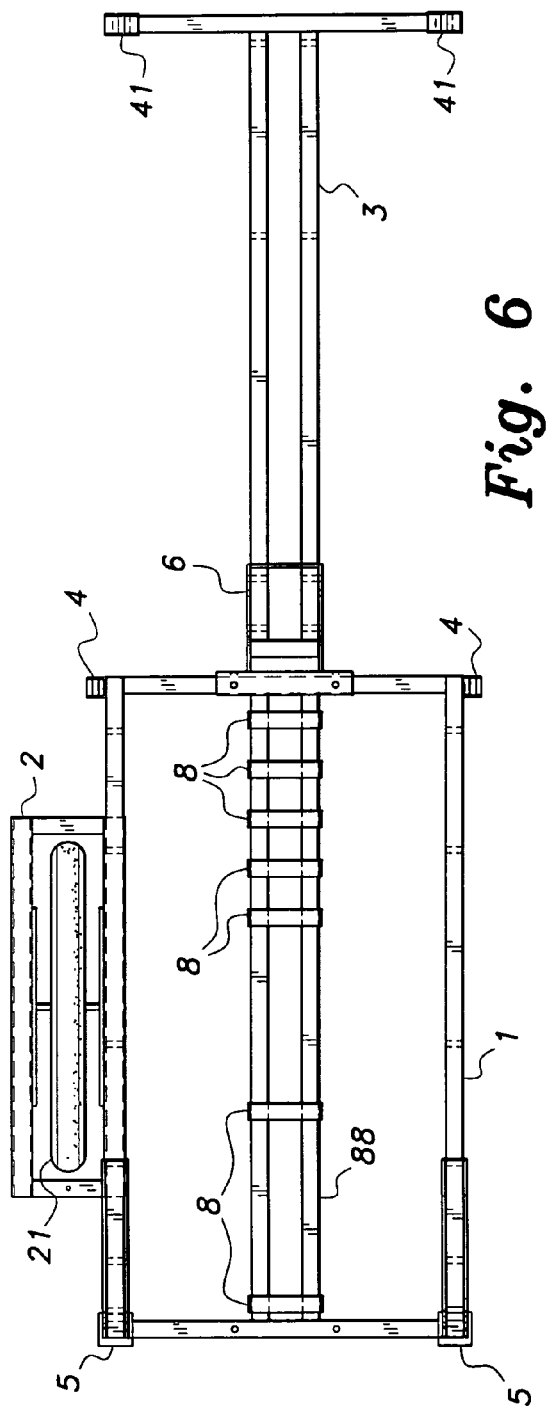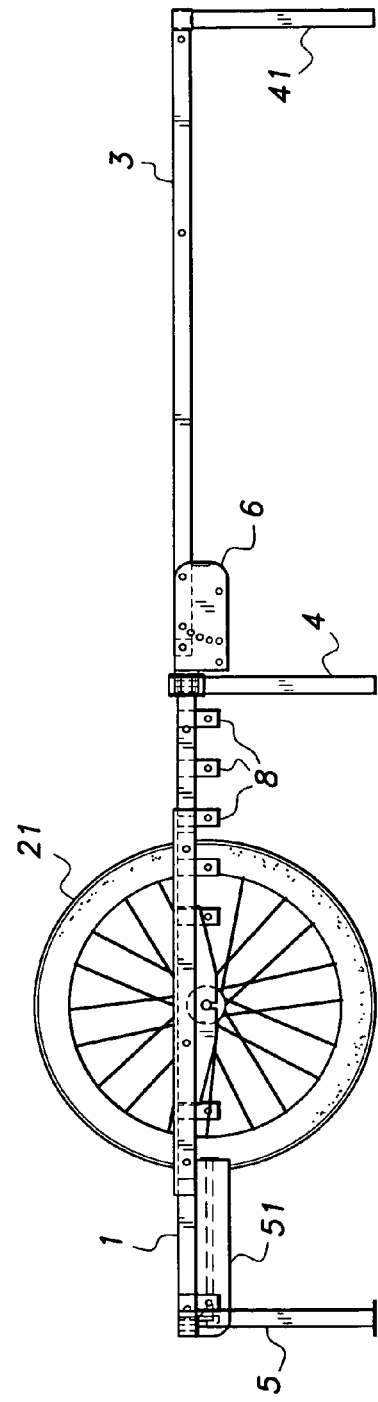
Fig. 6
Fig. 7

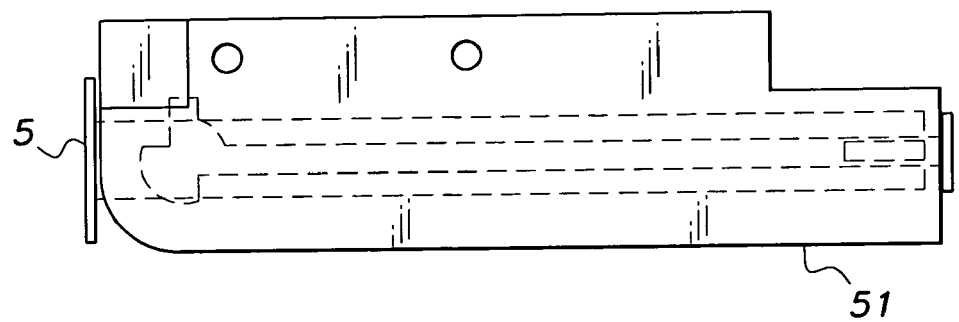
Fig. 9C
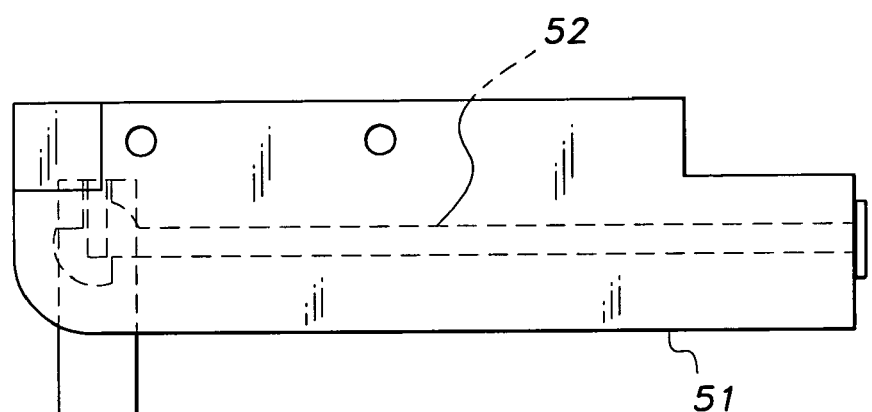
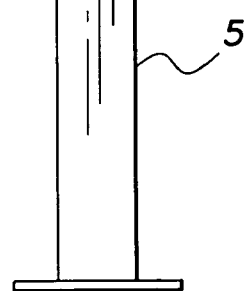
Fig. 9D

MULTIPLE USE CONVERTIBLE VEHICLE

CROSS-REFERENCE TO RELATED APPLICATION

This application claims the benefit of U.S. Provisional Patent Application Ser. No. 60/418,723, filed Oct. 17, 2002.

BACKGROUND OF THE INVENTION

1. Field of the Invention

The present invention relates to a multiple use convertible vehicle. More specifically, the vehicle can be conveniently converted manually into any of various configurations, including a hand-towed cart, a hand-truck/dolly, a vehicle-towed trailer, a sleeping platform and a chair.

2. Description of Related Art

There are many known kinds of handcarts and trailers, such as for transporting heavy objects over long distances and over difficult terrain. There is a need, however, for a vehicle that can be easily converted into a hand cart, hand truck or a trailer, depending upon the situation. For example, hunters need carts to carry heavy loads (carrion), such as deer or elk, which can weigh hundreds of pounds. The hunter needs to be able to transport this load from an out-of-the-way area, e.g., woods or forest, by hand to his/her load-pulling vehicle (e.g., garden tractor or bicycle) where the load can be transferred to the load-pulling vehicle. This invention fills this need by providing a multiple use convertible vehicle which can be converted easily by hand into a hand-towed cart configuration for manually pulling loads, or into a hand-truck configuration, or into a trailer configuration which can be attached by hitch to a load-pulling vehicle, such as a garden tractor or bicycle.

The purpose of the present invention is to provide an individual, e.g., hunter or fireman, with the capability of transporting heavy objects (like deer or firefighting tools) either manually as a hand-towed cart or as a trailer attachable by hitch to a load-pulling vehicle.

The present invention fulfills this need by providing a multiple use vehicle in which the handle of the vehicle can be detached and reattached in several configurations to permit either the transportation of heavy objects manually in the configuration of a cart or as a trailer attachable by hitch to another vehicle.

In an alternative embodiment, the wheel frames (containing the tires) of the multiple use convertible vehicle can be repositioned manually either internally of the main frame structure or externally, depending upon the size of the load being transported and the desired configuration of the vehicle. In yet another embodiment, leg supports can be optionally attached to or detached from the structure.

International Patent No. WO 93/02879, published Feb. 12, 1993, teaches a multi-purpose modifiable vehicle capable of being converted among various configurations. The vehicle can be self-powered and is capable of being operated either on land or in water. It can also be configured alternatively between a manually towed cart and a hitched trailer. However, this patent lacks details regarding the manner in which the particular parts of the structure are assembled, e.g., there is no handle that is reattachable to convert the vehicle in the manner described in the present invention.

U.S. Pat. No. 2,387,093, issued to Schmied on Oct. 16, 1945, discloses a trailer in which the wheel can be moved alternatively between a forward and a rearward position.

U.S. Pat. No. 5,228,716, issued to Dahl on Jul. 20, 1993, discloses a general convertible transport handcart in which the handcart can be modified from a flat-bed to an upright (dolly) orientation.

U.S. Pat. No. 5,257,892, issued to Branch on Nov. 2, 1993, discloses a dolly/handcart combination in which the handle can be detached and reattached between the two configurations.

U.S. Pat. No. 5,282,520, issued to Walker on Feb. 1, 1994, discloses a portable hunting stand and game carrier in which the structure can be alternatively converted between a hand cart and a stationary stand.

U.S. Pat. No. 5,489,109, issued to Murphy on Feb. 6, 1996 discloses a dolly with a removable handle that can be alternatively used as a handle or a hitch.

U.S. Pat. No. 6,102,370, issued to Johnston on Aug. 15, 2000, and Canadian Patent No. 1,220,680 issued to Deare, both disclose adjustable-width wheel bases.

None of the above inventions and patents, taken either singly or in combination, is seen to describe the instant invention as claimed.

SUMMARY OF THE INVENTION

The present invention is a multiple use convertible vehicle which can be modified manually into various configurations, including a hand-towed cart, a hand-towed truck/dolly, a hitchable trailer, a bed, a chair and a bicycle rack depending upon the manner of attachment of a removable handle, removable wheel frames, a removable hitch bracket and a removable hitch, all mounted to a main frame structure.

In the hand-towed cart configuration, the handle is attachable to the main frame structure in an extended fashion and at an angle to the hitch bracket. In the hand-truck/dolly configuration, the handle is attachable in an extended position from the main frame. In the hitchable trailer configuration, the handle is attachable in a retracted or an extended position beneath the main frame to allow use of the vehicle as a hitchable trailer. In the bicycle rack configuration, the handle is detached from the main frame and one end of the externally mounted wheel frame is detached, forming a pivot point at the attached end. A bike rack accessory works cooperatively with the reconfigured cart, in such manner as to secure the cart to the back of a motor vehicle. One or more bicycles may then be mounted over the extended legs of the cart. Further, the handle can be attached to the main frame at an angle to obtain a chair configuration, and retractable/extendable and attachable legs can be used to provide additional support. Finally, the handle can be attached to the main frame in an extended fashion to form a bed configuration, and detachable and retractable legs can be used for vertical support.

Two removable wheel frames can be mounted to the main frame to provide either a narrow or a wide configuration, e.g., depending on the width of the loads being carried or the terrain. In the narrow configuration, the wheel frames are mounted inside the main frame. In the wide configuration, the wheel frames are mounted outside the main frame, thus providing a wider load-supporting surface.

Removable panels and sideboards are provided to give additional enclosing structure to the vehicle for carrying smaller objects, such as knapsacks, or for providing a surface when the vehicle is in the bed or chair configuration.

Accordingly, it is a principal object of the invention to provide a multiple use convertible vehicle which can be converted alternatively between a hand-towed cart configuration, or a hand-towed truck/dolly configuration, both of which can be pulled using a handle, or a trailer configuration in which the vehicle can be hitched to and pulled by another vehicle, such as a garden tractor or bicycle.

It is another object of the invention to provide a multiple use vehicle in which the handle can be conveniently placed out-of-the-way within the main frame of the structure in the trailer configuration.

It is a further object of the invention to provide a multiple use convertible vehicle in which the wheels are mounted on wheel frames that are detachable and reconnectable in alternative positions inside or outside and to the center and rear of the main frame structure of the vehicle, depending upon the desired configuration.

Still another object of the invention is to provide a multiple use vehicle in which detachable and reconnectable legs are provided for converting the vehicle into a chair or bed structure.

Still another object of the invention is to provide a multiple use vehicle in which legs are provided that are selectively retractable or extendable.

Still another object of the invention is to provide a multiple use convertible vehicle in which an optional detachable deck and sideboard panels are provided to enclose and cover portions of the vehicle structure in any of the configurations.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2A is a plan view of the multiple use vehicle in the bicycle- or tractor-towed cart configuration with the handle extended.

FIG. 2B is a cross-sectional detail view of the point at which the wheel frame is attached to the main frame of the vehicle.

FIG. 3 is an elevation view of the multiple use vehicle in the bicycle- or tractor-towed cart configuration with the handle extended.

FIGS. 4A, 4B and 4C are side views showing the handle attached to the hitch bracket in different positions of attachment in the hand-towed cart, bed or chair configurations.

FIG. 6 shows a plan view of the multiple use vehicle configured as a bed.

FIG. 7 shows an elevation view of the multiple use vehicle configured as a bed.

FIGS. 9C and 9D are elevation views showing the telescoping front leg in the retracted and extended positions, respectively.

Similar reference characters denote corresponding features consistently throughout the attached drawings.

DETAILED DESCRIPTION OF THE PREFERRED EMBODIMENTS

The present invention is a multiple use convertible vehicle and, more specifically, a multiple use convertible vehicle which is manually convertible into various configurations including a hand-towed cart, a hand-truck/dolly, a hitchable trailer, a bike rack, a bed and a chair by conveniently attaching various. removable components to a main frame structure using attachment elements (e.g., pins).

Figure 1:
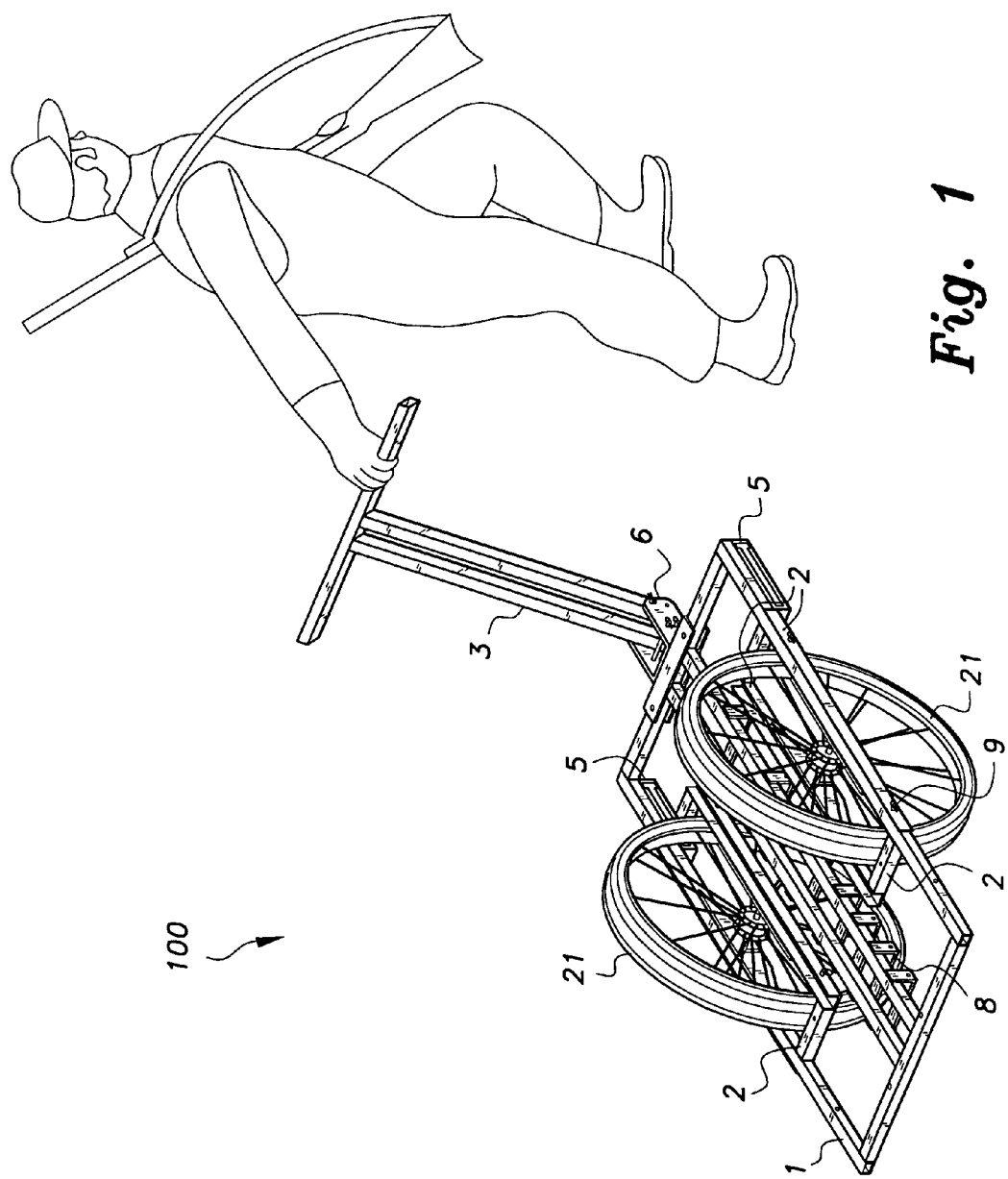
FIG. 1 shows an environmental, perspective view of the multiple use vehicle according to the invention being used in the hand-towed cart configuration.

FIG. 1 shows the multiple use convertible vehicle in accordance with the invention in the configuration of a hand-towed cart 100. At one of the ends of the vehicle is a hitch attachment bracket 6, which attaches a hitch (not shown in FIG. 1) to the main frame 1 of the vehicle structure. In the configuration shown in FIG. 1, the handle structure 3 extends outwardly and at an adjustable angle from the front of the main frame 1 of the vehicle. Two removable wheel frames 2, each having its own wheel 21 and its own all-terrain tire mounted on it, are attached to the main frame 1 using appropriate attachment elements, such as high strength pins 9. The wheel frames 2 are shown mounted inside (i.e., "narrow-wheel" configuration), and centered between, the front and the rear of the main frame 1 in FIG. 1. However, the wheel frames 2 can also be mounted outside the main frame 1 and toward the rear, as will be discussed further below.

Figure 10A:
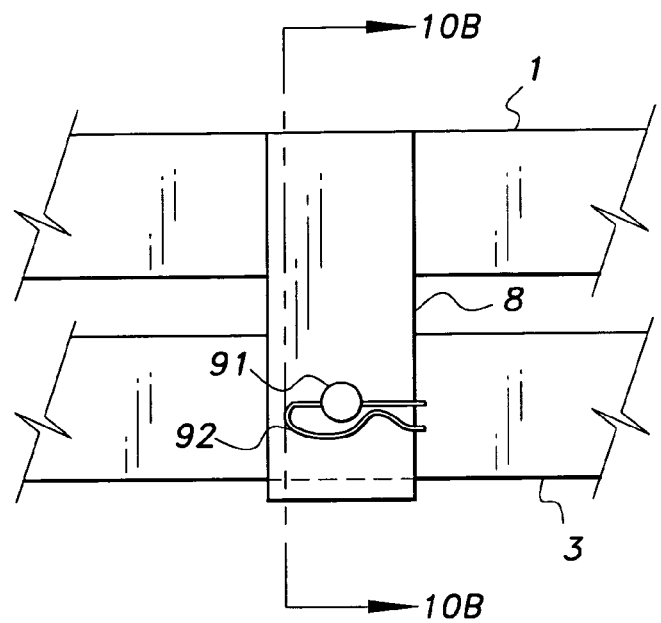
FIG. 10A shows a fragmented side view of a portion of the handle structure where it attaches to the support brackets of the main frame of the vehicle.
Figure 10B:
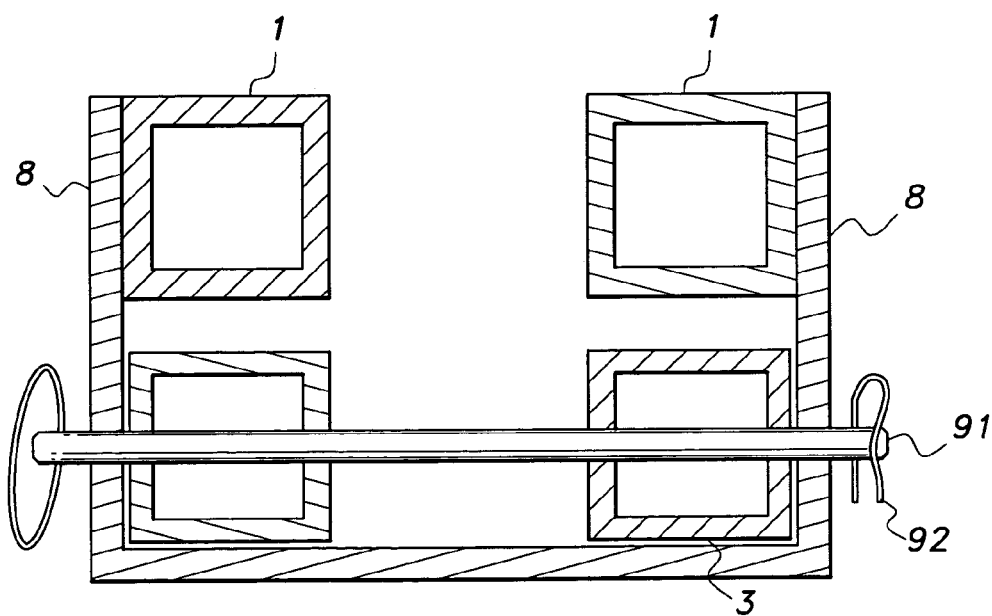
FIG. 10B is a section view along lines 10B—10B of FIG. 10A.

FIGS. 2A and 3 show a plan view and elevation view, respectively, of the multiple use vehicle in the narrow-wheel, bike-towed cart configuration. The hitch bracket 6, in this case, is shown attached to the front of the vehicle with a hitch 7 attached. The handle 3 is shown in an extended position. In an extended position, the handle 3 can be used as a tie-down or support for larger or longer loads. The handle 3 is attached to U-shaped brackets 8 on the main frame 1 using attachment elements 9, such as pins. FIG. 3 shows an elevational view of the multiple use vehicle in the narrow bike-towed cart configuration. In this view, the U-shaped brackets 8 are shown which provide points of attachment for the handle structure 3 using attachment elements 9. Also, the U-shape of the brackets 8 provides a support for the handle structure until the pins 9 are attached. Details of the point of attachment of the handle 3 to the frame 1 are shown in FIGS. 10A and 10B. The handle 3 is shown resting on the bracket 8. The bracket 8 is permanently attached to the main frame 1, e.g., by welding. An attachment pin 91 is then inserted through the brackets and the handle structure and a hitch pin 92 is placed at the end of the pin 91 to hold the handle in place.

Also, in FIG. 2A, attachment holes 11 in the main frame 1 are shown, which provide points of attachment for the wheel frames 2. In the configuration shown in FIG. 2A, the two wheel frames 2 are positioned inside the main frame 1 (corresponding to the "narrow-wheel" configuration). However, either or both wheel frames 2 can be mounted alternatively on the outside of main frame 1 as shown, for example, in the bed configuration of FIG. 6 or the hand-pulled cart in FIG. 18. The sides of the wheel frames 2 are generally U-shaped channels 22, shown in FIG. 2B, which are attached to the main frame 1 using any suitable attachment elements, such as attachment pin 200 and hitch pin 201.

Figure 18:
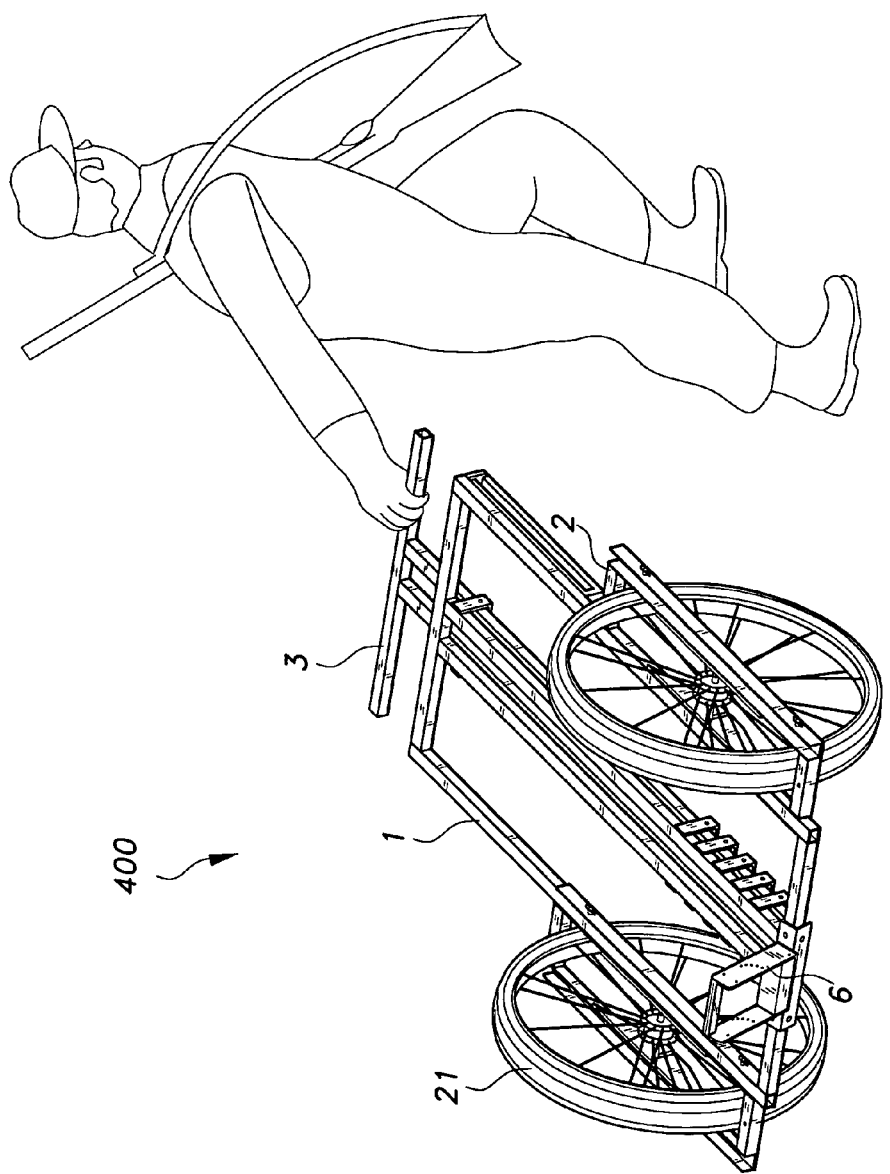
FIG. 18 shows the multiple use convertible vehicle in a hand-truck configuration.

When the wheel frames are both mounted on the outside, as shown in FIG. 18, the cart 400 is in the "wide-wheel" configuration. In this configuration, the cart has a wider surface on which to place or tie-down objects.

Figure 11:
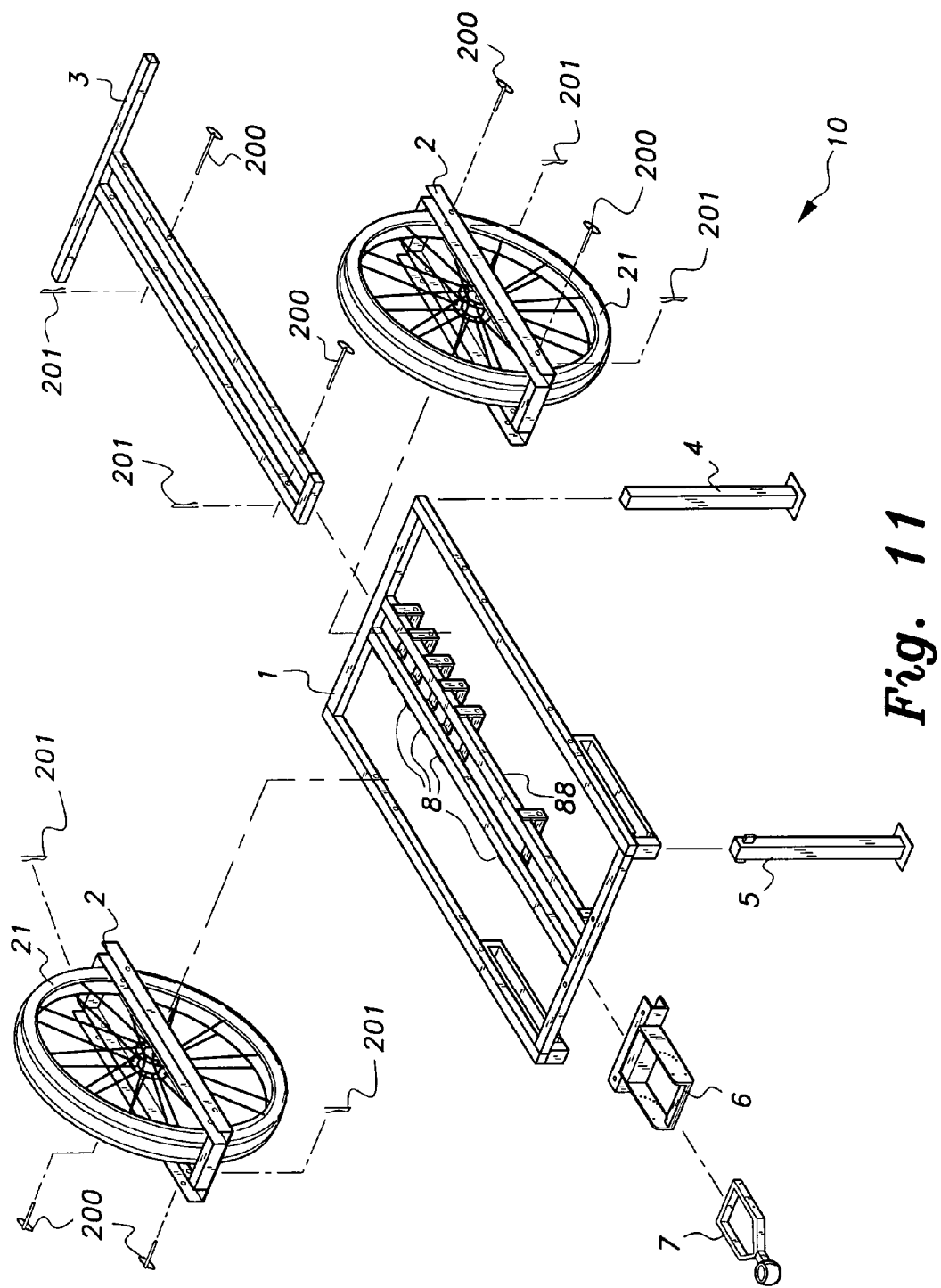
FIG. 11 is an exploded perspective view of the multiple use convertible vehicle according to the present invention.

FIG. 11 illustrates an exploded view of the multiple use convertible vehicle 10 according to the invention. As shown, through the middle of the main frame 1 is a long narrow rectangular support structure 88 on which the several support brackets 8 are mounted along its length. A hitch 7 attaches to the hitch bracket 6 using attachment elements. Also, a rear leg 4 and a front leg 5 are shown. Attachment elements, 200 and 201, are used to fasten the T-shaped handle structure 3 to the brackets 8 on the main frame 1 in either an extended (load carrier/tie down configuration) or a retracted (trailer configuration) position.

If desired, the handle structure, 3, can be attached to the main frame 1 in a retracted position in which the handle portion of the handle structure 3 is flush against the rear edge of the main frame 1. Moreover, the handle structure 3 can be attached to the brackets 8 of the main frame 1 in any position from the fully extended to the fully retracted positions, including intermediate positions, as desired, depending upon the load being supported and the terrain. For example, the handle structure 3 might be fully extended in the bicycle- or garden tractor-towed configuration for transporting longer loads.

FIGS. 4A, 4B and 4C show the handle structure 3 attached to the hitch bracket 6 in several possible arrangements depending upon the angle and the particular hole used in the arcuate set of attachment holes shown in the hitch bracket 6. The particular position in which the handle structure 3 is attached, converts the multiple use convertible vehicle into a bicycle- or tractor-towed cart or hand-towed cart (i.e., with the handle positioned either horizontally level or at an angle in FIG. 4A), a bed (FIG. 4B) or a chair (FIG. 4C), depending upon the angle the handle makes with respect to the main frame 1. When the handle 3 is completely detached, the multiple use convertible vehicle converts into a vehicle mounted bike rack (FIGS. 17A and 17B) as discussed more fully below.

Figure 5A:
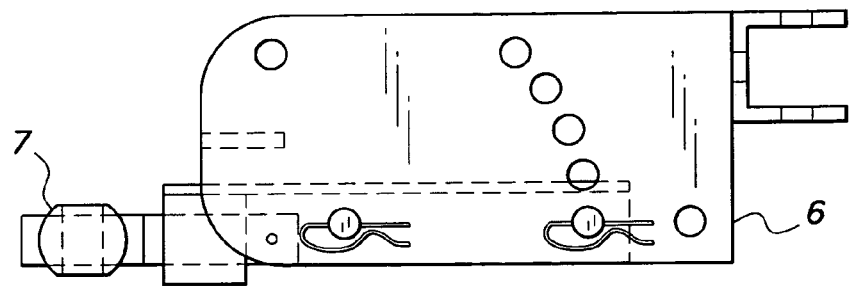
FIGS. 5A, 5B, 5C and 5D are side views showing the hitch attached to the hitch bracket in various positions.
Figure 5B:
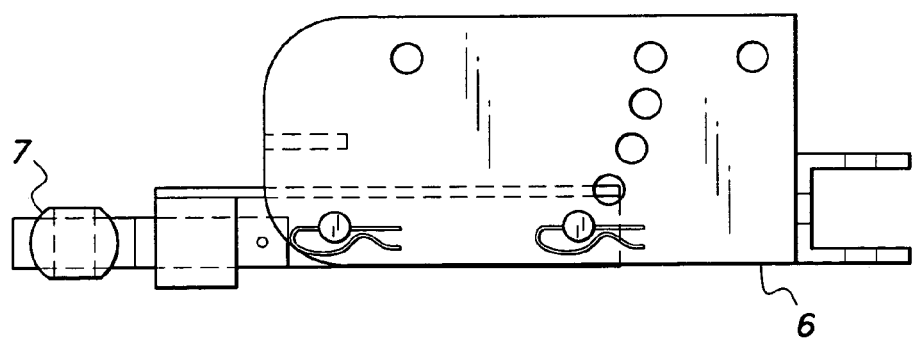
Figure 5C:
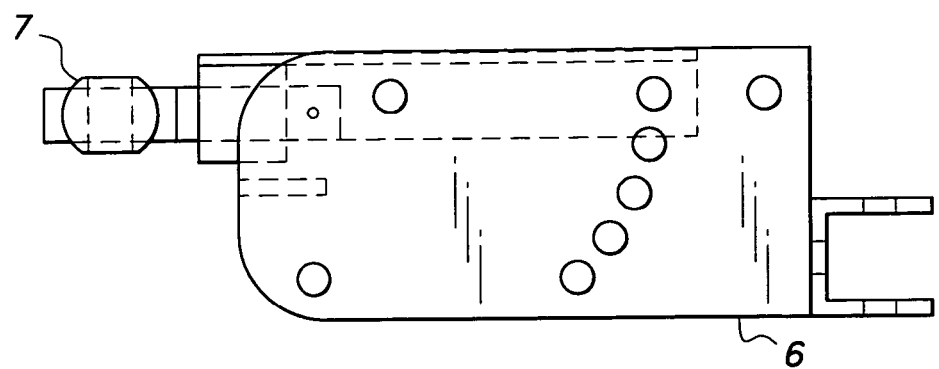
Figure 5D:
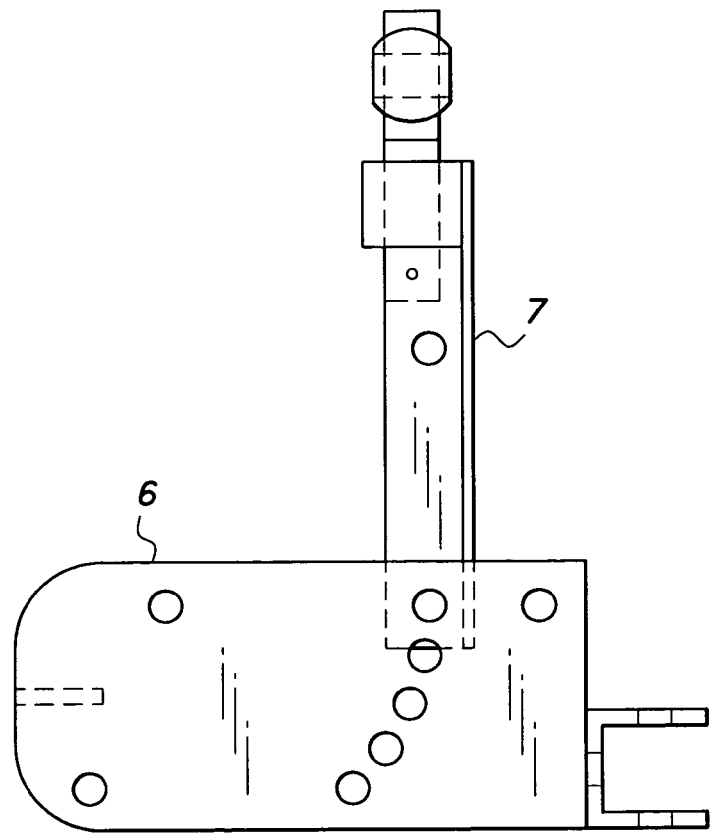

The hitch 7 can also be attached to the hitch bracket 6 in various configurations, as shown in FIGS. 5A–5D, depending upon the desired height of the hitch 7 relative to the hitch mount on the vehicle, and the presence or absence of the handle 3. The lowest position is shown in FIG. 5A; the intermediate position is in FIG. 5B; and, the highest position is in FIG. 5C. FIG. 5D shows the placement of the hitch 7 in an upright orientation in the bracket 6 when the handle is attached, e.g., in the hand-towed cart configuration.

When it is desired to convert the multiple use convertible vehicle into a bed configuration, as shown in plan view in FIG. 6, and elevation view in FIG. 7, the handle structure 3 is removed from the front of the main frame 1 and is attached to the hitch support 6 at the rear of the main frame 1. Rear legs 4 are then attached to the rear of the main frame 1 and additional legs 41 are attached to the distal ends of the handle structure 3 to provide vertical support. Front legs 5 are extended downward to provide additional vertical support for a user lying on the structure. Also, although only one of the wheel frames 2 is shown attached to the outer side of main frame 1 in FIG. 6, both wheel frames 2 may be attached to the main frame 1 instead of one, if so desired.

Figure 8A:
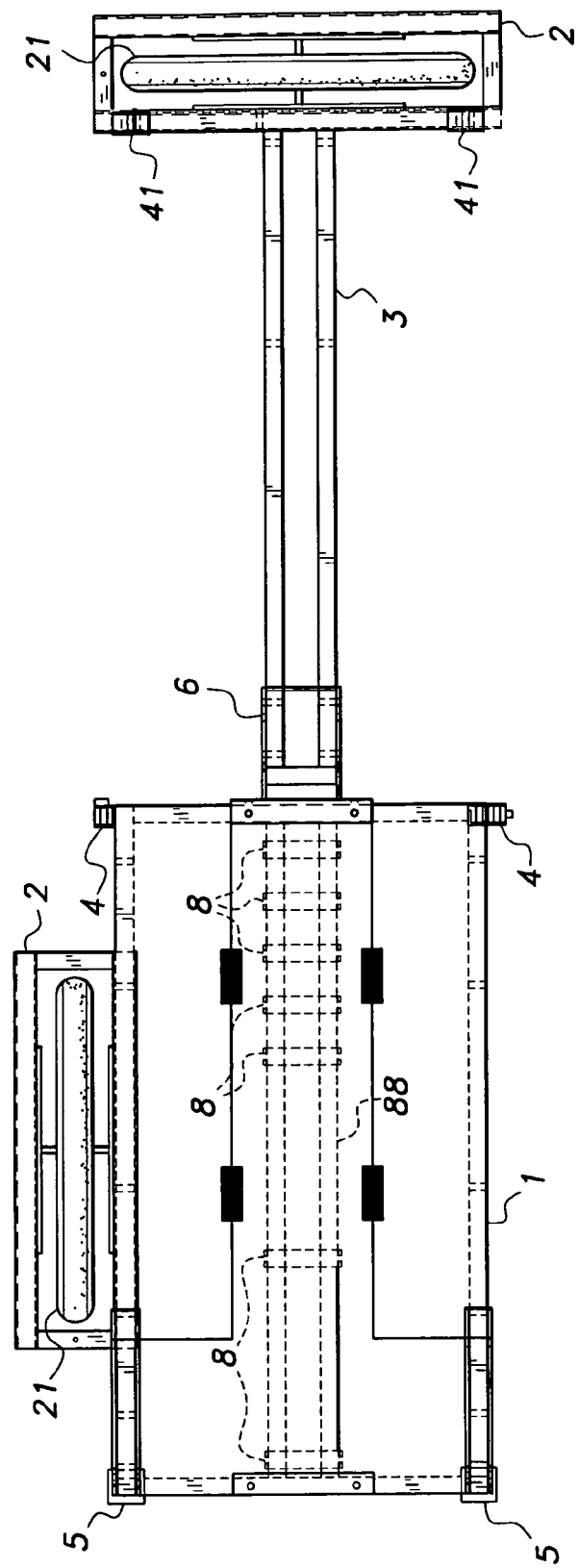
FIG. 8A shows a plan view of an alternative embodiment of the multiple use vehicle in the bed configuration.

Instead of using the removable handle legs 41 described above, an alternative vertical support for the handle 3 in the bed configuration is provided by attaching one of the wheel frames 2 to the handle 3, as shown in FIG. 8A. Special attachment pins having a length generally about twice the length of those used elsewhere in the vehicle are used to fasten one of the wheel frames 2 to the handle 3. The longer attachment pins are placed through the holes provided in the wheel frames 2 and through the holes in the handle 3 and a hitch pin is applied to hold the attachment pins in place.

Figure 9A:
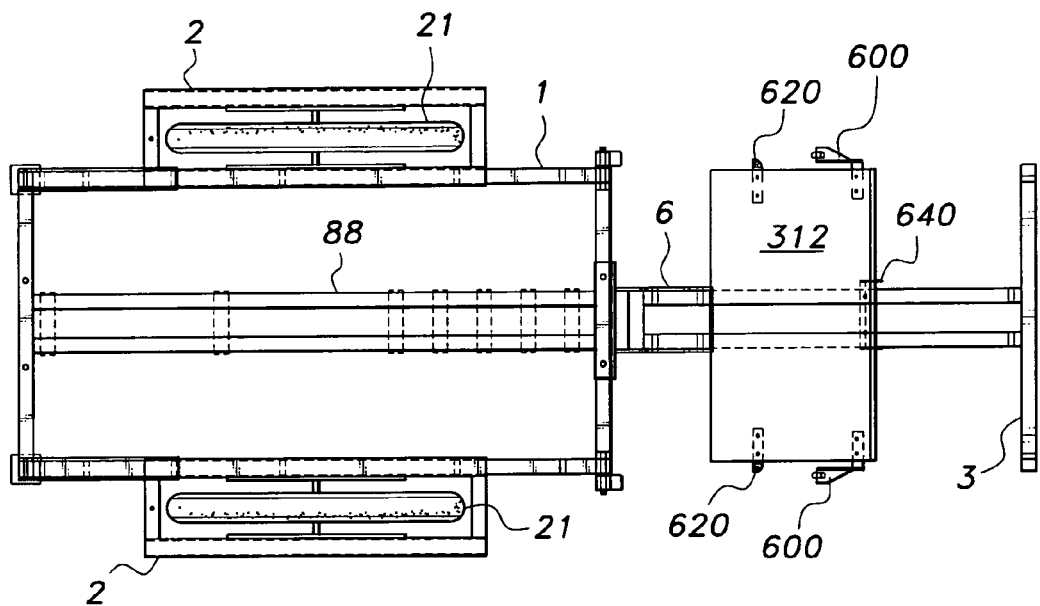
FIG. 9A shows a plan view of the multiple use vehicle configured as a chair.

FIG. 9A shows the multiple use convertible vehicle configured for use as a chair. In this configuration, the handle 3 is attached at two places in the hitch bracket 6, including one of the arcuately arranged holes. Also, rear legs 4 are attached to the rear of the main frame 1 and the front legs 5 are extended downward from the front of the main frame 1 to provide vertical support. A flat panel is attached to the handle 3 structure to provide a user with back support. The panel may be attached to the handle 3 structure with a U-shaped bracket 640, also shown in FIG. 15E. The U-shaped bracket 640 is attached to the back of the panel, and at the top center of the panel. The holes on each arm of the bracket 640 are aligned with corresponding holes on the sides of the handle 3 structure. An attachment pin is then inserted through the bracket 640 and handle 3 structure, with a retaining pin inserted through the end of the attachment pin to secure the panel to the handle 3 structure. In addition, a rectangular deck is attached to the top of the main frame 1 to further support the user. The deck may have one or more pinned brackets attached along its edges that coincide with one or more holes along the perimeter of the main frame 1, so that the pins are inserted into the holes.

FIGS. 9C and 9D show details of one of the two front legs 5 in a retracted and extended configuration, respectively. The front legs 5 are easily extended or retracted by sliding them along a channel within their respective support structures 51. A tab at the top end of the front leg 5 moves along a slot 52 in the structure 51 and keeps the front leg 5 from being completely detached from the main frame structure 1. However, the legs also can be easily removed or reattached, if desired.

Figure 12A:
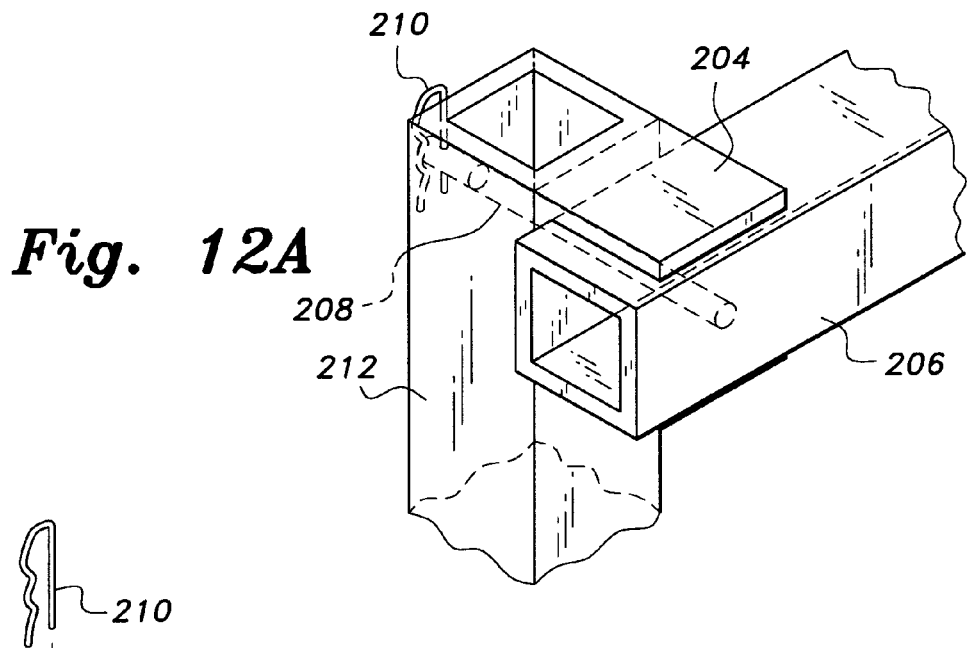
FIG. 12A is a fragmented, perspective view showing an alternative modification for the rear legs.
Figure 12B:
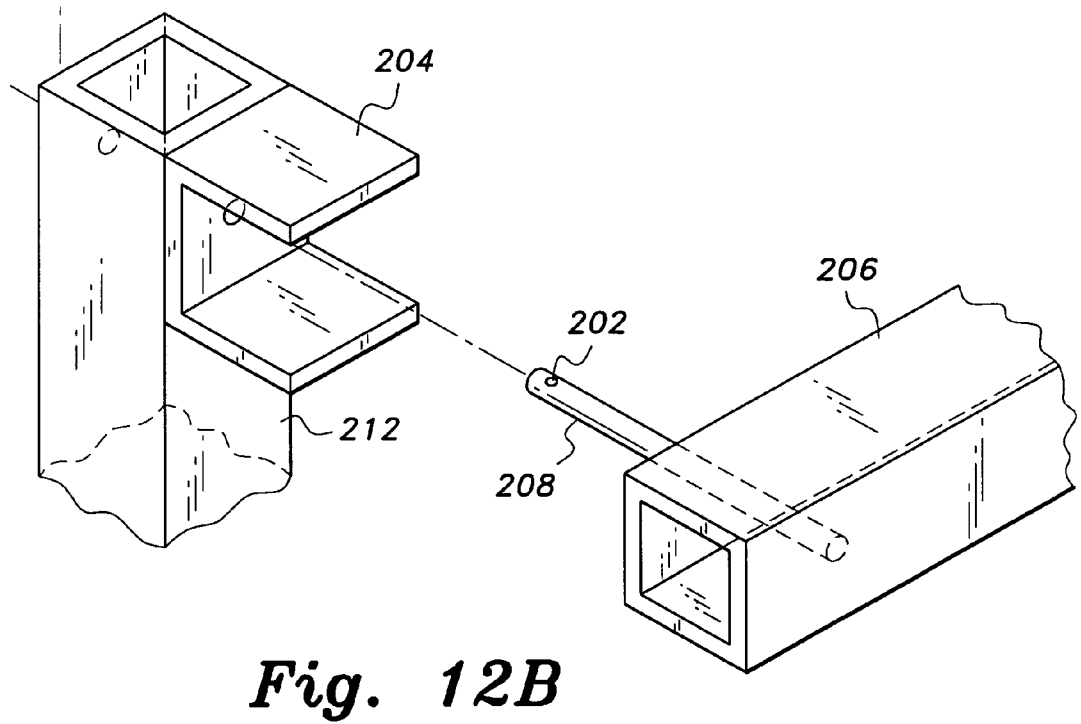
FIG. 12B is a fragmented, exploded perspective view of the assembly of FIG. 12A.

FIGS. 12A and 12B show an alternative arrangement for attaching the legs to the main frame structure. In this arrangement, a pin 208 is permanently attached, e.g., by welding, to the main frame 206 at a position close to the ends of the frame. Pin 208 in this case is protruding out from the frame. Leg 212 is modified at one of its ends to include a small U-shaped channel 204, e.g., by welding. A hole is provided through the U-shaped channel and through the opposite side of the leg structure to permit the passage of the pin 208. In the position shown, the leg structure provides vertical support. However, the leg can be turned 180° and mounted to the same pin 208, i.e., in an upward direction, to provide support for side boards.

The leg 212 is attached to the frame by placing the modified end of the leg onto the frame 206, causing the pin 208 to protrude from the opposite side of the leg 212 and be held in place using a hitch pin 210 inserted through the transverse opening 202 in the tip of the protruding pin 208 as shown in FIG. 12A.

Figure 8B:
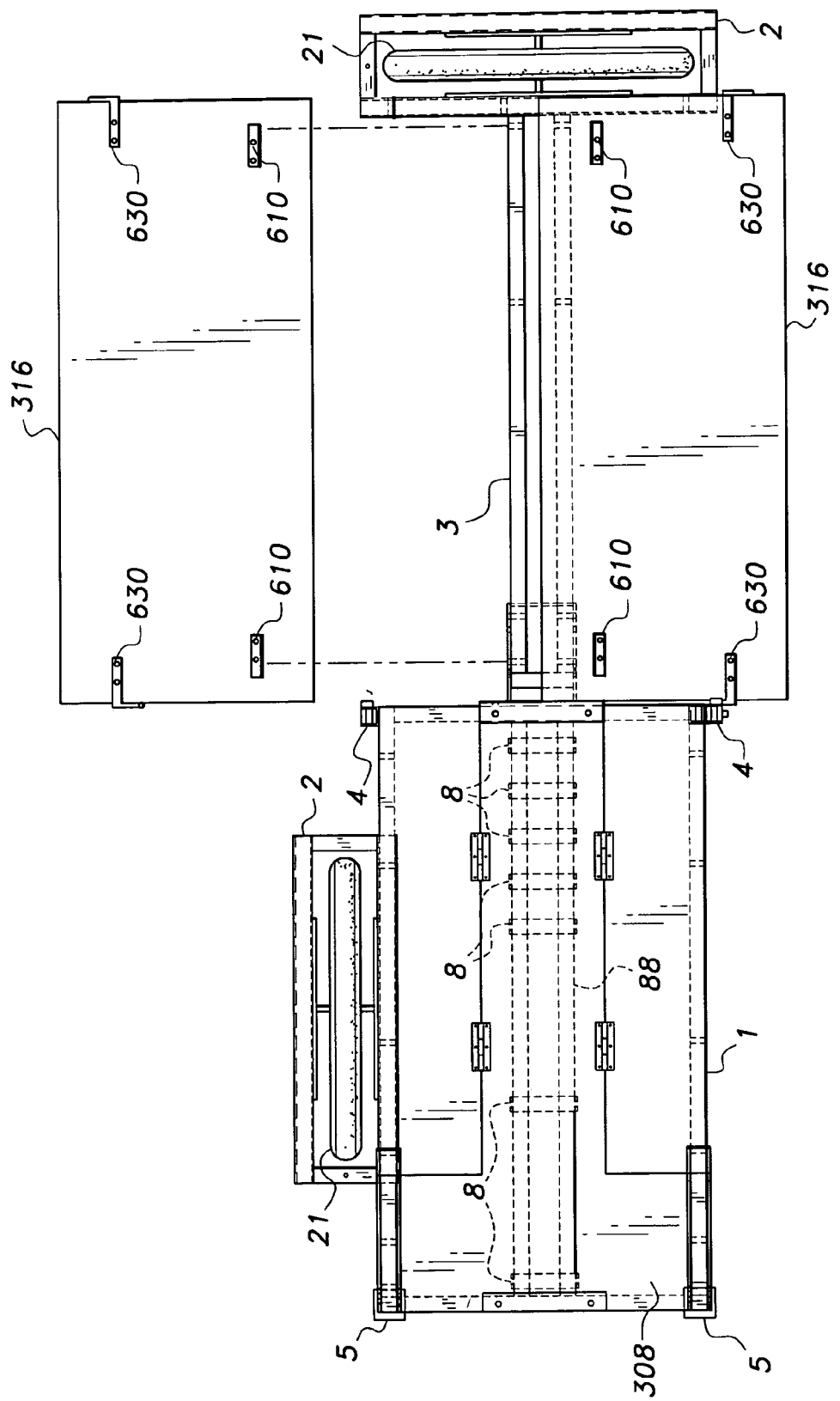
FIG. 8B shows a plan view of the multiple use vehicle in the bed configuration with side panels.
Figure 9B:
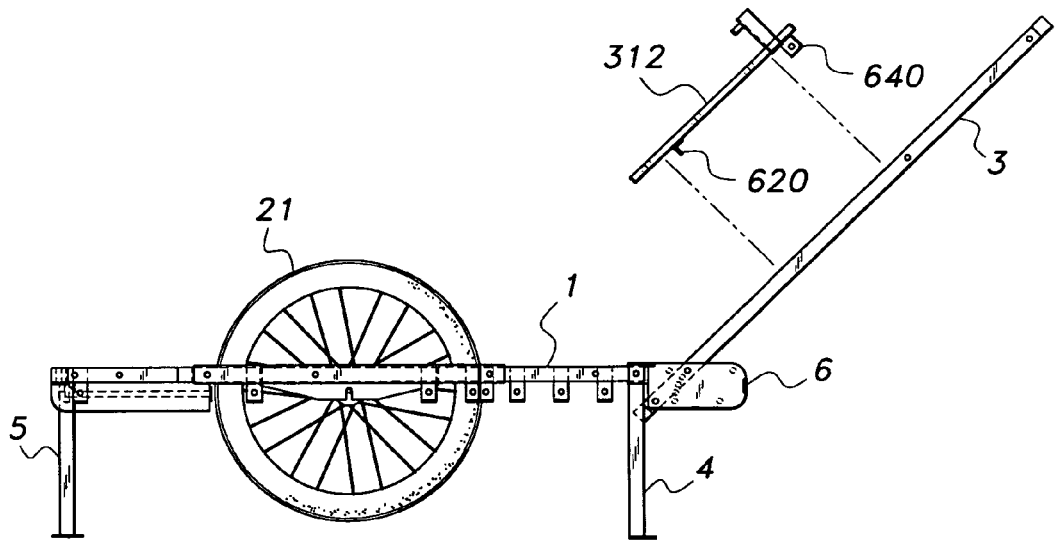
FIG. 9B shows an elevation view of the multiple use vehicle configured as a chair.

In order to provide support surfaces and enclosures in the bed or chair configurations, removable decks and side board panels can be optionally attached to the main frame 1 and handle structure 3, as shown in FIGS. 8B, 9A and 9B. These can be made of any suitably firm material, e.g., plastic or wood material.

Figure 13:
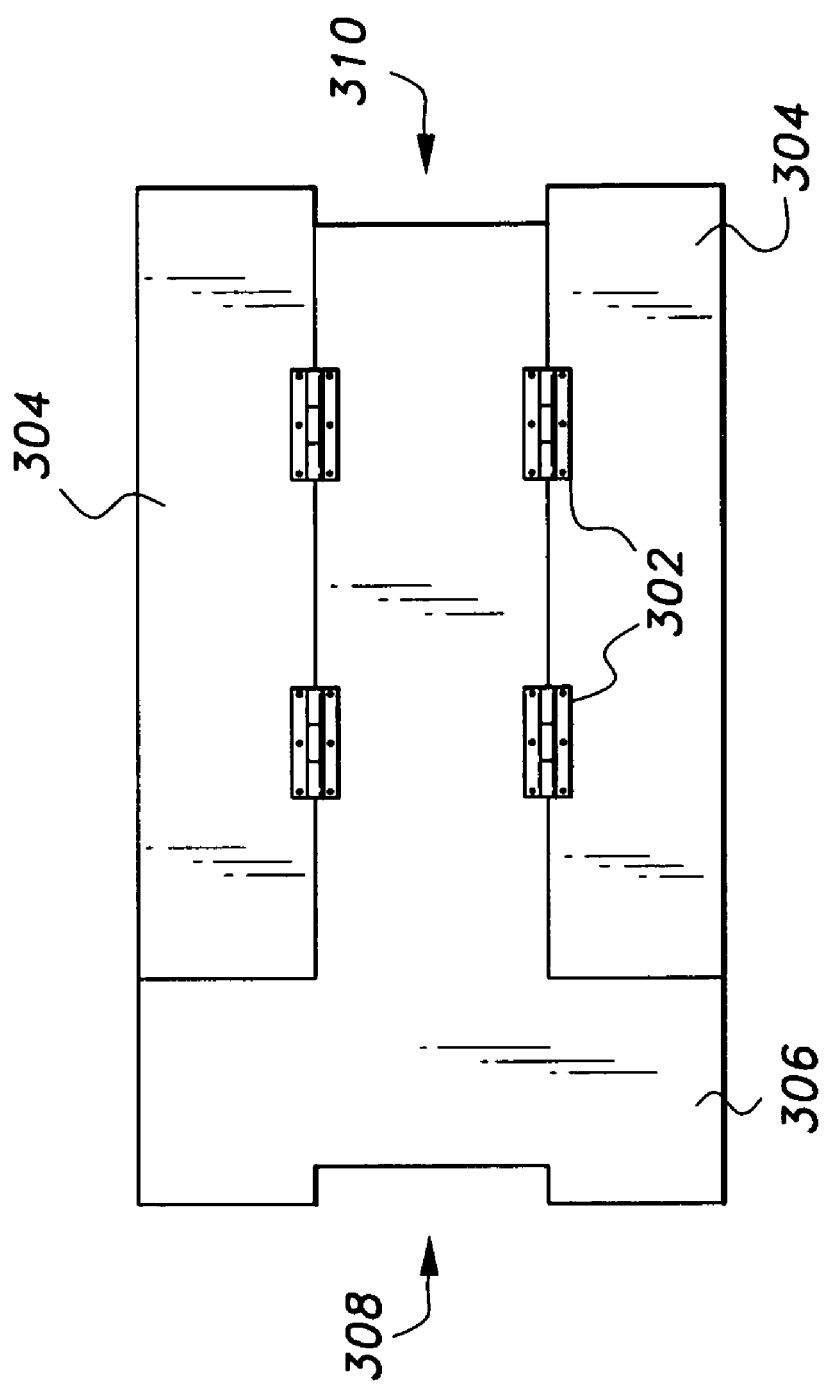
FIG. 13 shows a plan view of a hinged deck panel usable on the multiple use convertible vehicle of the present invention.
Figure 15C:
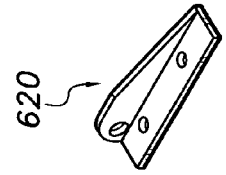
FIGS. 15A, 15B, 15C, 15D, 15E, and 15F show perspective views of hardware components used to attach the deck and sideboard panel members to the vehicle and to form a walled enclosure thereon.
Figure 15F:
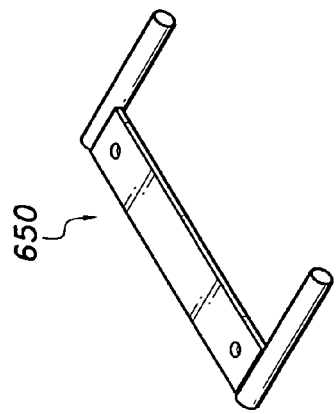
Figure 15B:
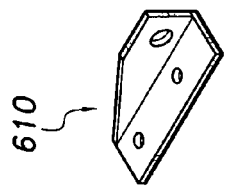

As shown in FIG. 8B, a flat surface is attached to the top of the structure by connecting rectangular panel members to the structure. More specifically, each panel member has pinned brackets 630, shown more fully in FIG. 15D, wherein the pins are generally planar to the panel. The pins slidably insert into slots on the structure. In the preferred embodiment, two slots are located at the top of the rear legs 4, two more at opposite ends of the parallel beam section of the handle structure 3, and two more at opposite ends of the wheel frame 2. The panels are thus supported by the wheel frame 2 and handle structure 3. In addition, a single rectangular deck, such as that shown in FIG. 13, is placed over the main frame 1 and attached thereto by inserting pins attached to the perimeter of the panel into corresponding holes on the front and rear of the main frame. The main frame 1 and central rectangular structure 88 support the deck. The deck and panels together form a uniform flat surface upon which a person can lay.

In FIG. 13, two side panels 304 are shown attached to a center panel 306 with hinges 302, e.g., piano hinges. Notches 308 and 310 are provided to ensure that the panel fits on the cart while also accommodating the hitch bracket 6. In the wide-wheel configuration, the panels are all coplanar and horizontally arranged as shown. However, in the narrow-wheel configuration, the two side panels 304 are positioned in a vertical orientation (not shown) with respect to the center panel 306 in order to fit on the cart in the space provided between the two wheels.

Figure 14:
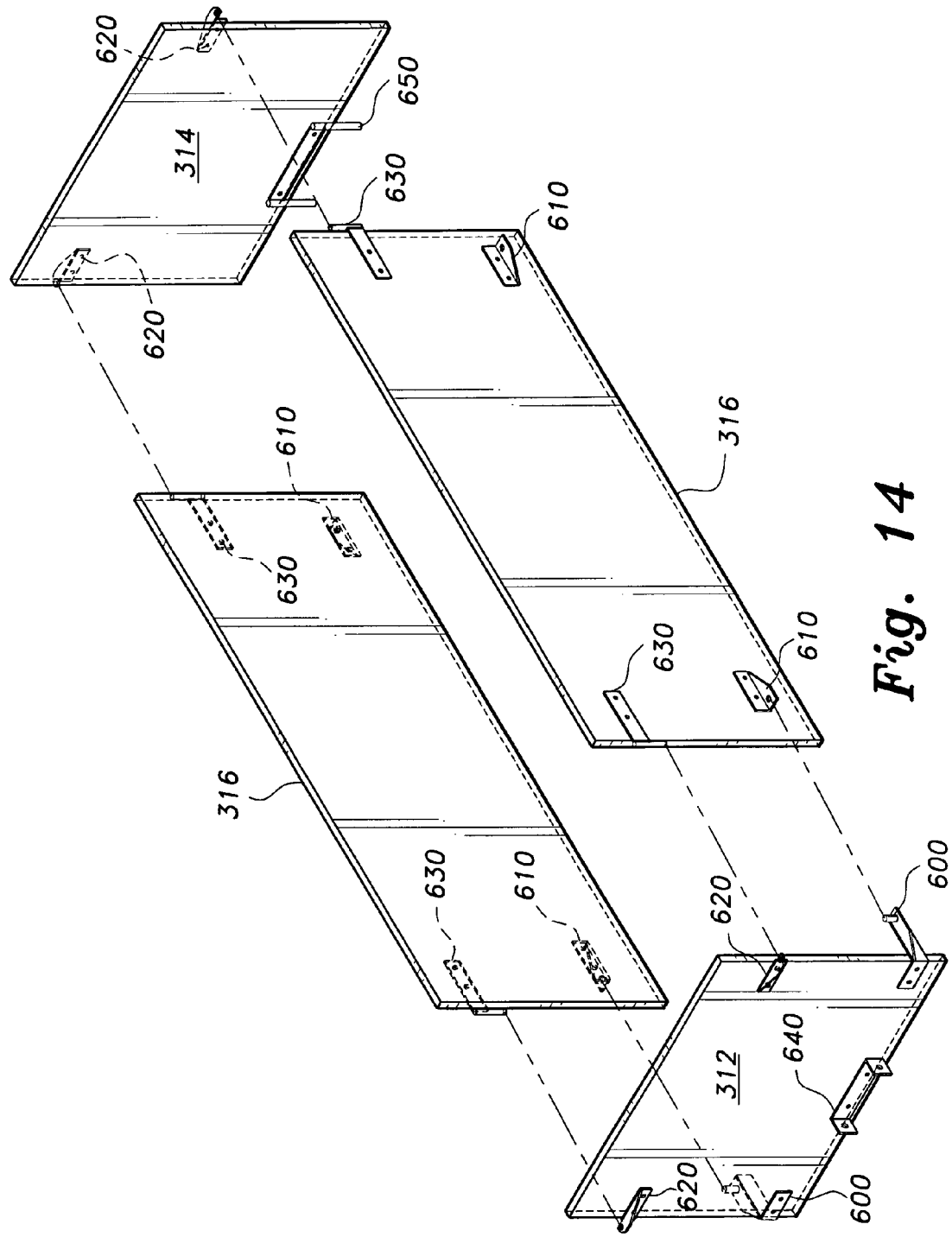
FIG. 14 is an exploded, perspective view showing deck and sideboard panel members usable on the multiple use convertible vehicle and which form an enclosure attachable to the vehicle.

In FIG. 14, a second panel arrangement is shown, comprising a front panel 312, a back panel 314 and two opposite side panels 316. The panels are equipped with bracket members, which connect the panels together to form a walled enclosure that attaches to the top surface of the main frame. More specifically, pinned brackets 600 (FIG. 15A), attached to opposite sides of the bottom of the front panel 312, mate with holed brackets 610 (FIG. 15B), disposed on opposite sides of the bottom of the side panels 316. Similarly, holed brackets 620 (FIG. 15C) attached to opposite sides of the top of the front 312 and back 314 panels, mate with pinned brackets 630 (FIG. 15D) attached at opposite sides of the top of the side panels 316. A two-pin bracket 650 (FIG. 15F) is attached to the bottom center of the back panel 314 and fits into slots on the main frame 1, thus attaching the back panel to the main frame 1. A four-walled enclosure is thus formed along the perimeter of the main frame 1, anchored by the back panel 314. The resulting structure can be placed on the cart to provide an additional holding space for various objects, e.g., backpacks. The side panels 316 can be easily assembled or disassembled by connecting the bracket members on the panels together and placing the assembled box-like structure onto the cart when needed.

Figure 15E:
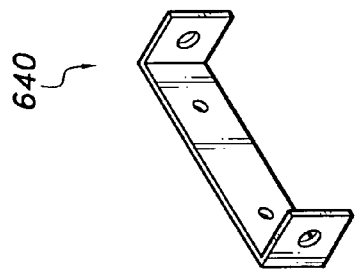
Figure 15A:
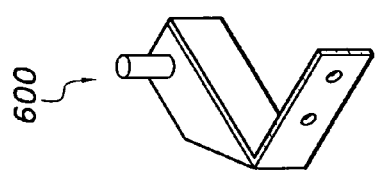
Figure 15D:
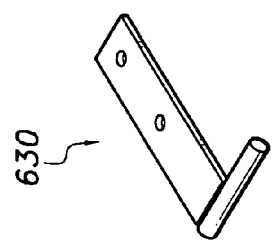
Figure 16A:
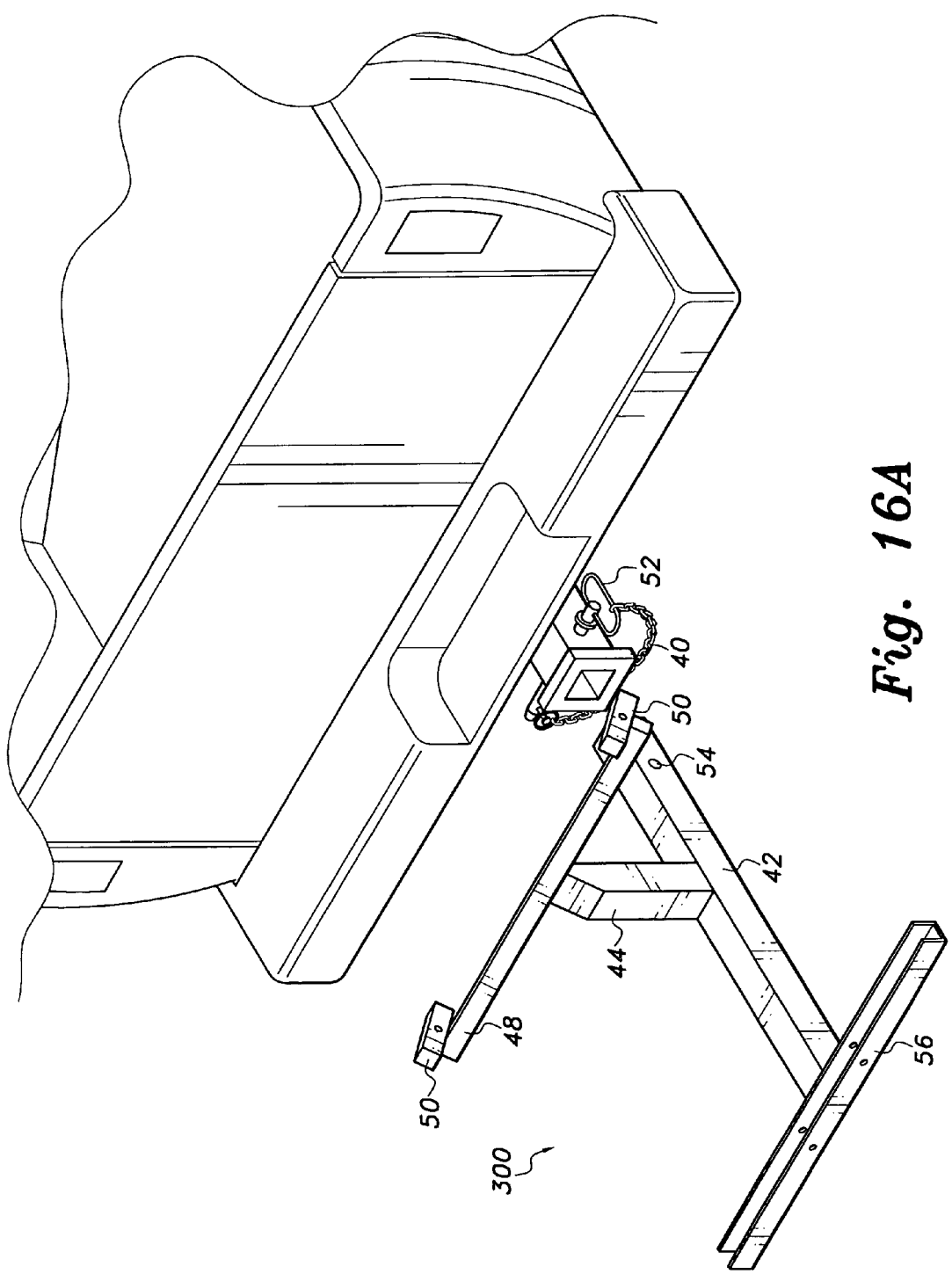
FIG. 16A shows an environmental, perspective view of the bike rack accessory.
Figure 16B:
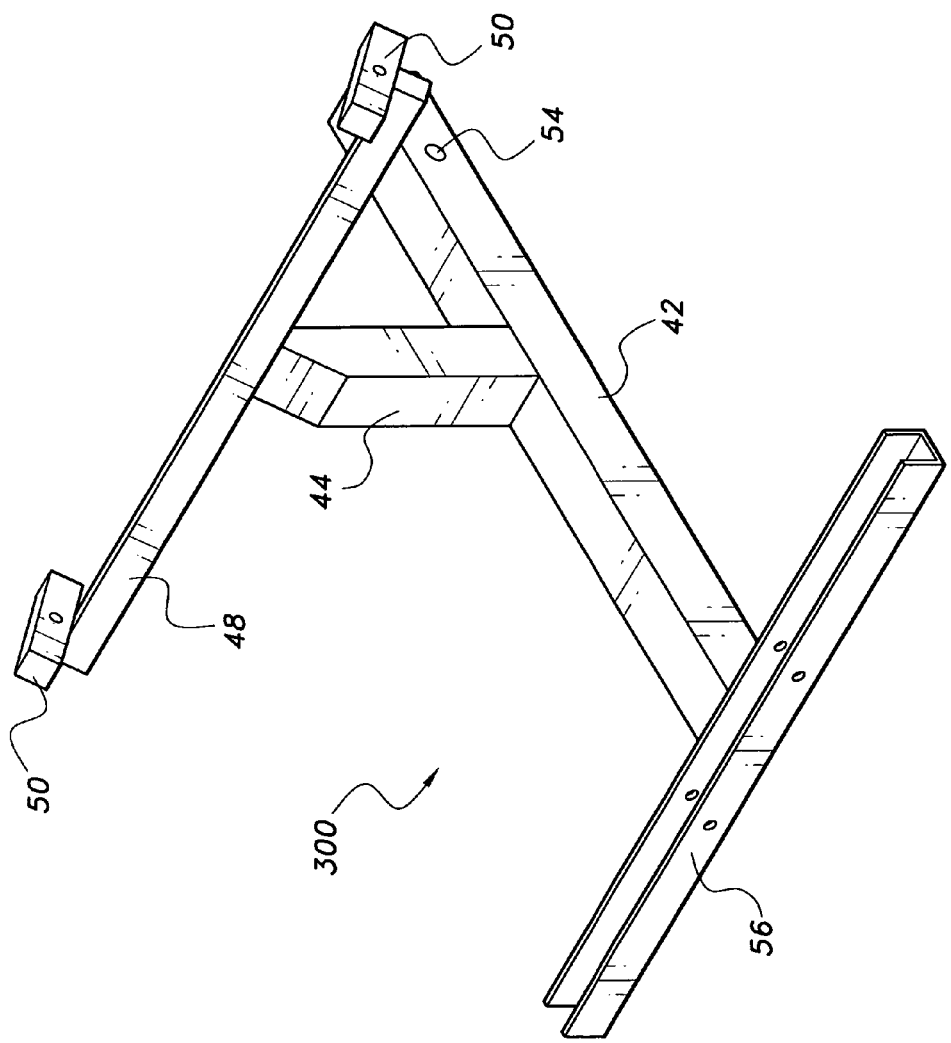
FIG. 16B shows a perspective view of the bike rack accessory.

The above-mentioned panel members are also used to form surfaces in the bed and chair configurations. For instance, the front panel of the enclosure 312 forms the back support member in the chair configuration in FIGS. 9A and 9B. The U-shaped bracket 640, shown in FIG. 14 and FIG. 15E, is used to attach the front panel 312 to the handle 3 structure, as shown in FIG. 9A. Similarly, the two side panels 316 in FIG. 14 are attached to the main frame 1 in the bed configuration, to form a surface for a person to lay upon, as shown in FIG. 8B.

Figure 17B:
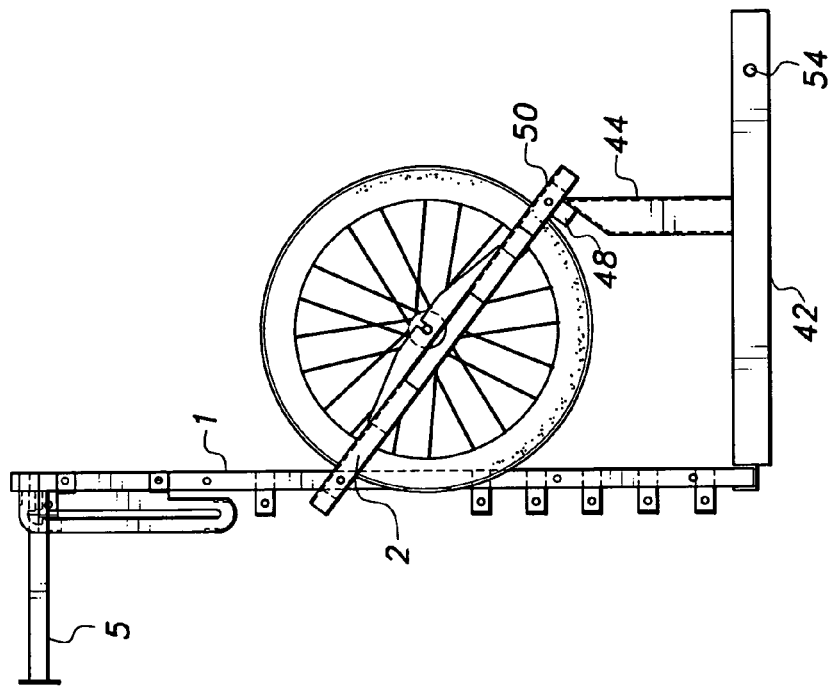
FIG. 17B shows an elevational view of the multiple use convertible vehicle in the bike rack configuration mounted on the bike rack accessory.
Figure 17A:
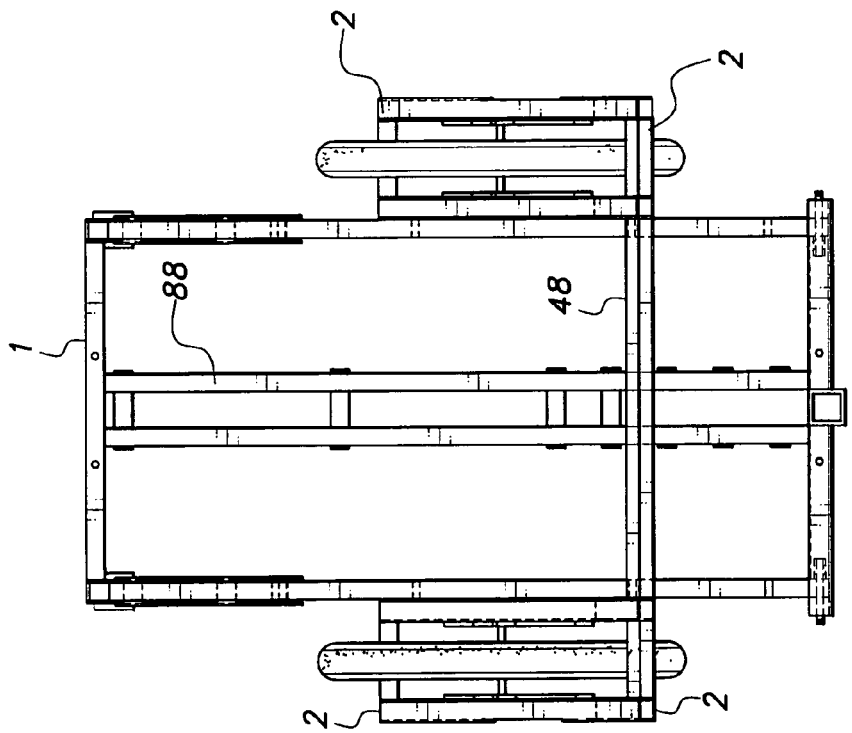
FIG. 17A shows a plan view of the multiple use convertible vehicle in the bike rack configuration.

FIGS. 17A and 17B show the multiple use convertible vehicle configured as a bike rack. To form the bike rack, the handle structure 3 is detached from the main frame 1. The wheel frame ends 2 closest to the hitch bracket 6 are then detached from the main frame 1, so that the wheel frame 2 pivots at the other end.

A bike rack accessory 300, shown in FIGS. 16A–17B and 19, is provided to hold the bike rack in place on any vehicle, such as truck T, equipped with a trailer hitch 40. The bike rack accessory 300 comprises an elongated, rectangular, hollow beam 42 having an opening at one end and a boom 56 at the other end forming a T-configuration. The open end of the beam 42 is designed to fit inside the opening in the vehicle trailer hitch 40. The boom 56 has a U-shaped channel along its length designed to receive the front end of the main frame 1 and hold the frame 1 in a vertical orientation.

A post 44 with an angled tip extends from the center of the beam 42. An elevated rectangular spar 48 is attached to the upper part of the angled tip surface, so that the flat surface of the spar 48 is level with the top edge of the angled tip. The spar 48 has perpendicular side member 50 attached at each end, each having a hole through its side for receiving a retaining pin.

Figure 19:
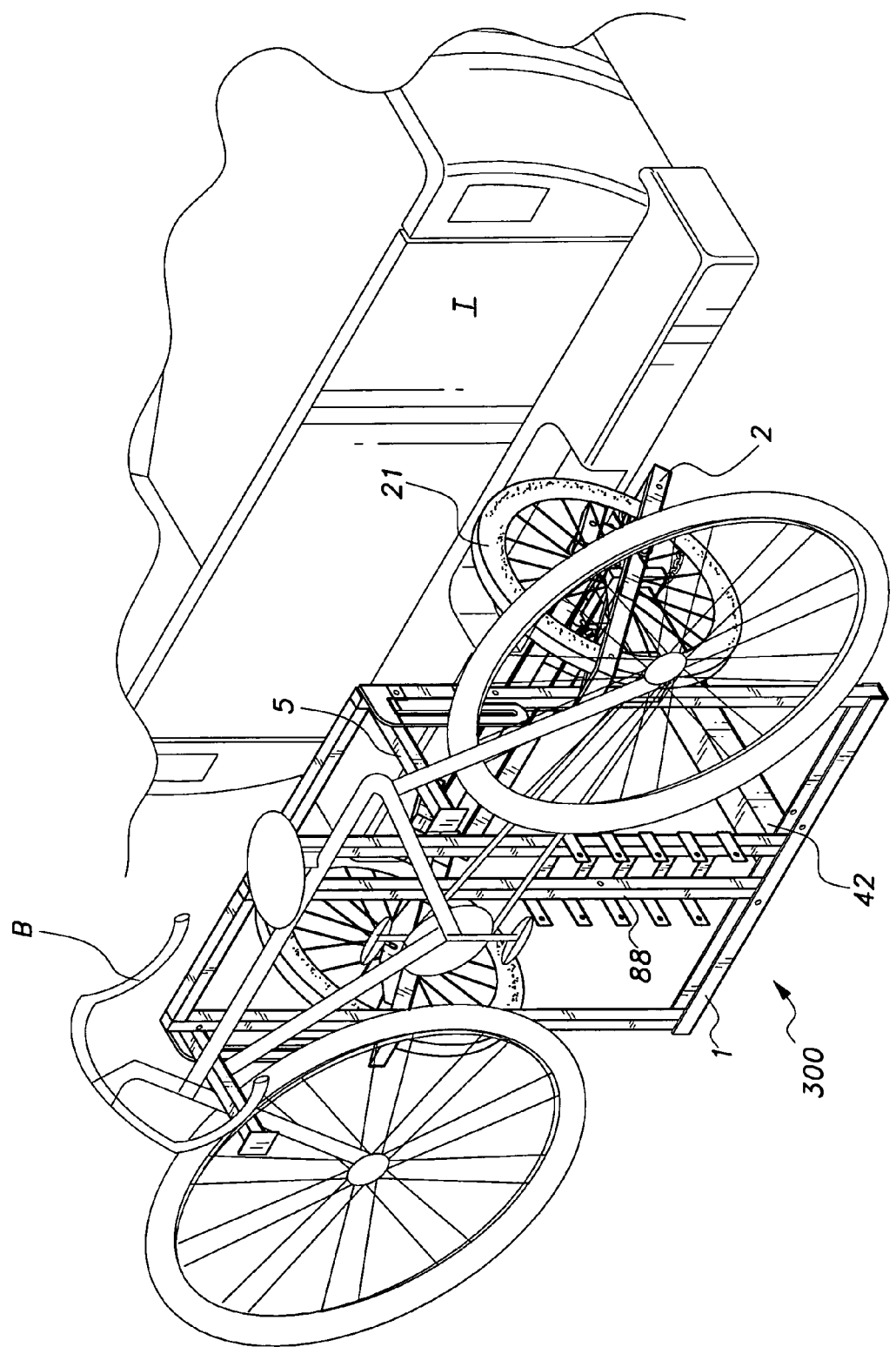
FIG. 19 shows an environmental, perspective view of the bike rack connected to the bike rack accessory, which is connected to the vehicle hitch.

The spar 48 and perpendicular side members 50 are designed to support the detached ends of the wheel frames 2 when the bike rack is mounted on the adapter, as shown in FIGS. 17B and 19. The detached ends of the wheel frames 2 rest on the flat surface of the spar 48 and adjacent to the perpendicular side members 50. The holes in the wheel frame 2 ends align with the holes in the perpendicular side members 50, so that an attachment pin is inserted through the overlapping holes to secure the wheel frames 2 to the perpendicular side members 50. A retainer pin is then inserted through a hole at the tip of the attachment pin. The bike rack is thus secured to the bike rack accessory 300.

The bike rack accessory is connected to the car hitch by sliding the open end of the beam 42 into the opening in the car hitch 40. A retaining pin 52 is then used to secure the bike rack accessory 300 to the car hitch. The retaining pin 52 slides through a hole on the side of the car hitch that overlaps a hole in the beam 42. Once the bike rack and bike rack accessory are secured, one or more bicycles B can be mounted over the front legs 5.

It is to be understood that the present invention is not limited to the sole embodiments described above, but encompasses any and all embodiments within the scope of the following claims.

We claim:

1. A multiple use convertible vehicle for use alternatively as a hand-towed cart, a dolly/hand truck, a hitchable trailer, a bicycle rack, a bed, and a chair, comprising:
   a main frame having a front end, a rear end and two sides, the two ends and two sides defining a generally rectangular shape;
   a rectangular support structure extending longitudinally from the front end to the rear end and between the sides of the main frame;
   a plurality of U-shaped support brackets attached to the rectangular support structure at spaced apart intervals, the brackets having handle mounting holes defined therein;
   a rectangular handle frame having a handle attached across one end thereof, the frame having a plurality of spaced holes defined therein, the frame being slidable through the U-shaped brackets and adjustably positioned therein by alignment of the holes in the frame and the bracket, at least one fastener being inserted through the aligned holes;
   two wheel frames, each wheel frame having a wheel mounted therein, the wheel frames being detachably mounted on the sides of the main frame;
   wherein the handle frame can be selectively attachable in an extended position towards the front end of the main frame and in an angled position thereto for use in a hand-towed cart configuration; in a position extending towards the rear end of the main frame for use in a trailer configuration; in an extended position from the front of the main frame and parallel therewith for use in a bed configuration; in an extended angular position from the front of the main frame for use in a chair configuration; or completely detached from the main frame in a bicycle rack configuration.

2. The multiple use convertible vehicle according to claim 1, further comprising a hitch bracket detachably mounted to the main frame.

3. The multiple use convertible vehicle according to claim 2, further comprising a hitch removably attached to the hitch bracket, the hitch being adapted for attachment to a vehicle.

4. The multiple use convertible vehicle according to claim 1, wherein said at least one fastener comprises:
   a pin having a transverse hole defined therein; and
   a hitch pin inserted through the transverse hole.

5. The multiple use convertible vehicle according to claim 1, further comprising a main panel, the main panel having a rectangular shape conforming to the main frame, the main panel being positioned on top of the main frame in order to form a surface adapted for bearing loads.

6. The multiple use convertible vehicle according to claim 5, further comprising two side panels are pivotally connected to said main panel, the side panels being movable between a horizontal orientation parallel to said main panel and a vertical orientation perpendicular to said main panel in order to form side walls.

7. The multiple use convertible vehicle according to claim 1, further comprising a plurality of panels attached to the main frame and handle frame in order to form a continuous, uniform, flat surface adapted for supporting a person lying down.

8. The multiple use convertible vehicle according to claim 7, wherein said plurality of panels are capable of being connected together in order to form a walled enclosure attachable atop the main frame for transporting loads.

9. The multiple use convertible vehicle according to claim 1, further comprising a plurality of supporting legs removably attached to the main frame and to the handle disposed at the end of the extended handle frame.

10. The multiple use convertible vehicle according to claim 1, further comprising a pair of channels attached to the front end of the main frame and a pair of legs extendible and retractable from the channels, the legs having a tab disposed at a top end of the legs which slidable along the channel and retaining the legs on the main frame.

11. The multiple use convertible vehicle according to claim 1, further comprising a bike rack accessory having:
   an elongated hollow beam having an opening at one end and U-shaped boom at the other end defining a T-configuration, the beam having a post with a slanted tip extending therefrom;
   a spar mounted atop the slanted tip, the spar having two perpendicular side members at opposite ends, each side member having a hole therein adapted for receiving a retaining pin;
   wherein the U-shaped boom supports the rear end of the main frame, the main frame being oriented vertically, the wheel frames being detached and resting on the spar and secured to the perpendicular side members by a fastener.

12. The multiple use convertible vehicle according to claim 11, wherein said beam has a hole defined therein adapted for receiving a retaining pin in order to secure said bike accessory to a car hitch.

* * * * *